United States Patent
Yang et al.

(10) Patent No.: US 9,632,841 B2
(45) Date of Patent: Apr. 25, 2017

(54) ELECTRONIC DEVICE CAPABLE OF CONFIGURING APPLICATION-DEPENDENT TASK BASED ON OPERATING BEHAVIOR OF APPLICATION DETECTED DURING EXECUTION OF APPLICATION AND RELATED METHOD THEREOF

(71) Applicant: MEDIATEK INC., Hsin-Chu (TW)

(72) Inventors: Chi-Wei Yang, Hsinchu (TW);
Che-Ming Hsu, Miaoli County (TW);
Wen-Tsan Hsieh, Hsinchu County (TW); Tai-Yu Chen, Taipei (TW);
Jih-Ming Hsu, Taoyuan County (TW);
Ming-Hsien Lee, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 14/290,933

(22) Filed: May 29, 2014

(65) Prior Publication Data

US 2015/0347203 A1 Dec. 3, 2015

(51) Int. Cl.
*G06F 3/00* (2006.01)
*G06F 9/44* (2006.01)
*G06F 9/46* (2006.01)
*G06F 13/00* (2006.01)
*G06F 9/50* (2006.01)

(52) U.S. Cl.
CPC .......... *G06F 9/5094* (2013.01); *Y02B 60/142* (2013.01)

(58) Field of Classification Search
None
See application file for complete search history.

(56) References Cited

U.S. PATENT DOCUMENTS

| | | | |
|---|---|---|---|
| 7,620,983 B1* | 11/2009 | Satish | 726/22 |
| 8,595,525 B2 | 11/2013 | Anderson | |
| 8,701,192 B1* | 4/2014 | Glick | G06F 21/566 726/24 |
| 2003/0226056 A1* | 12/2003 | Yip | G06F 11/0715 714/4.1 |
| 2005/0210035 A1* | 9/2005 | Kester | G06F 11/3476 |
| 2006/0150163 A1* | 7/2006 | Chandane | G06F 11/3612 717/131 |
| 2008/0005736 A1* | 1/2008 | Apacible et al. | 718/100 |
| 2012/0198569 A1* | 8/2012 | Halas | 726/30 |

OTHER PUBLICATIONS

Anit Kumar et al., "HybDTM: A Coordinated Hardware-Software Approach for Dynamic Thermal Management," Jul. 2006, 1-59593-381—Jun. 6, 0007, pp. 548-553, retrieved from http://ieeexplore.ieee.org/stamp/stamp.jsp?tp=&arnumber=1688858 on Jul. 31, 2015.*

* cited by examiner

*Primary Examiner* — Tuan Dao
*Assistant Examiner* — William C Wood
(74) *Attorney, Agent, or Firm* — Winston Hsu; Scott Margo (57) ABSTRACT

An electronic device has a processing system and a management circuit. The processing system executes an application. The management circuit detects an operating behavior of the application during execution of the application, analyzes the detected operating behavior of the application to generate an application identification result, and configures an application-dependent task according to at least the application identification result.

20 Claims, 6 Drawing Sheets

FIG. 1

| APP₁ | ... | APP_N |
|---|---|---|
| APP launch information + run-time information | | APP launch information + run-time information |
| APP launch information + run-time information | | APP launch information + run-time information |
| ... | | ... |
| APP launch information + run-time information | | APP launch information + run-time information |

$\underbrace{\qquad\qquad}_{\text{Machine learning}} \rightarrow \overset{B_1}{(B_{1\_1}+B_{1\_2})}$ ... $\underbrace{\qquad\qquad}_{\text{Machine learning}} \rightarrow \overset{B_N}{(B_{N\_1}+B_{N\_2})}$

ELECTRONIC DEVICE CAPABLE OF CONFIGURING APPLICATION-DEPENDENT TASK BASED ON OPERATING BEHAVIOR OF APPLICATION DETECTED DURING EXECUTION OF APPLICATION AND RELATED METHOD THEREOF

BACKGROUND

The disclosed embodiments of the present invention relate to managing tasks performed by an electronic device, and more particularly, to an electronic device capable of configuring an application-dependent task (e.g., a dynamic thermal management task) based on an operating behavior of an application detected during execution of the application and related method thereof.

In general, the mobile device skin temperature is constrained for offering the user with comfortable handheld experience. When the mobile device has more power consumption, more heat is generated correspondingly. The mobile device's peak power consumption is high. For example, the peak power consumption may be 4-8 Watts. However, the heat dissipation capability of the mobile device is generally limited. For example, mobile device's heat dissipation capability is about 2-4 Watts. Hence, to prevent the mobile device skin temperature from exceeding an acceptable level, a dynamic thermal management (DTM) is required. The conventional DTM design employs a fixed thermal strategy, regardless of the application running on the mobile device. As a result, the same thermal strategy is used for all kinds of applications on the mobile device, which fails to achieve the optimal thermal constrained performance for each application.

SUMMARY

In accordance with exemplary embodiments of the present invention, an electronic device capable of configuring an application-dependent task (e.g., a dynamic thermal management task) based on an operating behavior of an application detected during execution of the application and related method thereof are proposed to solve the above-mentioned problem.

According to a first aspect of the present invention, an exemplary electronic device is disclosed. The exemplary electronic device includes a processing system and a management circuit. The processing system is arranged to execute an application. The management circuit is arranged to detect an operating behavior of the application during execution of the application, analyze the detected operating behavior of the application to generate an application identification result, and configure an application-dependent task according to at least the application identification result.

According to a second aspect of the present invention, an exemplary method for configuring an application-dependent task is disclosed. The exemplary method includes: executing an application, detecting an operating behavior of the application during execution of the application, analyzing the detected operating behavior of the application to generate an application identification result, and configuring the application-dependent task according to at least the application identification result.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The main idea of the present invention is to identify an application currently running on an electronic device, and then configure an application-dependent task at least based on the application identification result. For example, the application-dependent task is a dynamic thermal management (DTM) task. The current application behavior is detected and then used for setting the best thermal strategy for the running application. For example, two applications with different running times may be executed under different thermal strategies that set the processor's clock frequency by different values. In this way, when applications have different operating behaviors, the applications are allowed to be assigned with different thermal strategies to achieve best thermal constrained performance. Further description of the proposed scheme used to configure an application-dependent task based on the application behavior is detailed as below.

Figure 1:
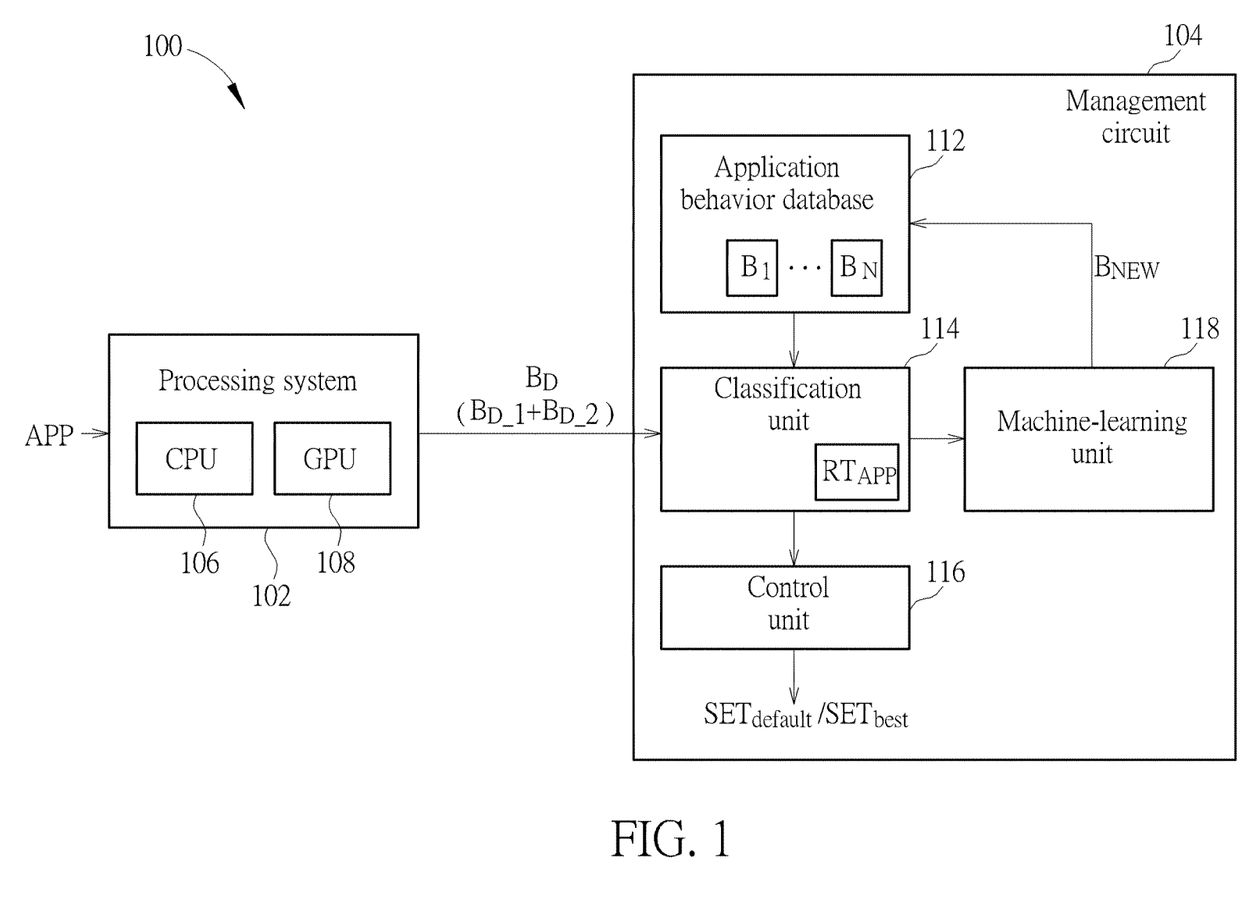
FIG. 1 is a diagram illustrating an electronic device according to an embodiment of the present invention.

FIG. 1 is a diagram illustrating an electronic device according to an embodiment of the present invention. By way of example, but not limitation, the electronic device 100 may a mobile device such as a cellular phone. The electronic device 100 includes, but is not limited to, a processing system 102 and a management circuit 104. In FIG. 1, the processing system 102 and the management circuit 104 are shown as separated circuit blocks. However, this is not meant to be a limitation of the present invention. In an alternative design, the processing system 102 and the management circuit 104 may be integrated in the same chip.

The processing system 102 may include one or more processors, and each processor may have a single core or multiple cores. In this embodiment, the processing system 102 includes a central processing unit (CPU) 106 and a graphics processing unit (GPU) 108. The processing system 102 is used to execute an application APP on the electronic device 100, where the CPU 106 may collaborate with the GPU 108 to deal with processing of the application APP.

The management circuit 104 is used to detect an operating behavior of the application APP during execution of the application APP, analyze the detected operating behavior of the application APP to generate an application identification result $RT_{APP}$, and configure an application-dependent task according to at least the application identification result $RT_{APP}$. In this embodiment, the management circuit 104 includes an application behavior database 112, a classification unit 114, a control unit 116, and a machine-learning unit 118. The application behavior database 112 may be stored and updated in an on-chip non-volatile memory (not shown) when the electronic device 100 is powered on. Alternatively, the application behavior database 112 may be stored into an on-chip non-volatile memory (not shown) when the electronic device 100 is powered down, and may be loaded into a volatile memory (not shown) and updated in the volatile memory (not shown) when the electronic device 100 is powered on. To put it simply, the present invention has no limitation on the storage means of the application behavior database 112.

The application behavior database 112 is arranged to store operating behaviors of different applications for identification of a current application running on the electronic device 100. The stored operating behaviors may include a pre-built operating behavior obtained before the electronic device 100 is manufactured, and/or a machine-learned operating behavior obtained during the running time of the electronic device 100. For one example, the application behavior database 112 has pre-built operating behaviors initially stored therein when the electronic device 100 is powered on for the first time, and the application behavior database 112 is updated to include machine-learned operating behaviors after the electronic device 100 starts running. For another example, the electronic device 100 has an empty application behavior database when the electronic device 100 is powered on for the first time, and the application behavior database 112 is created and updated to include machine-learned operating behaviors after the electronic device 100 starts running.

As shown in FIG. 1, the application behavior database 112 may store operating behaviors $B_1$-$B_N$ of a plurality of specific applications $APP_1$-$APP_N$. Based on the actual design of the application behavior database 112, the specific applications $APP_1$-$APP_N$ may have predetermined applications (which are known at the time the electronic device 100 is manufactured) only, new applications (which are not known at the time the electronic device 100 is manufactured and are identified when running on the electronic device 100) only, or a combination of at least one predetermined application and at least one new application.

In a preferred embodiment, the operating behaviors $B_1$-$B_N$ are pre-built operating behaviors, and the specific applications $APP_1$-$APP_N$ are predetermined applications. Specifically, the application behavior database 112 may be determined before the electronic device 100 is manufactured and shipped to the market. In this way, the requirement for real-time database update on the electronic device 100 can be relaxed. Please refer to FIG. 2, which is a diagram illustration computation of the pre-built operating behaviors $B_1$-$B_N$ according to an embodiment of the present invention. For example, the manufacturer may select a plurality of user frequently used applications $APP_1$-$APP_N$ as the predetermined applications under test. Each of the predetermined applications $APP_1$-$APP_N$ may be tested several times. For example, each test result may include application launch information and application run-time information. The application launch information is obtained at the time the application is launched, and may include loaded shared libraries, process virtual memory map and/or system call history. It should be noted that this is for illustrative purposes only, and is not meant to be a limitation of the present invention. In an alternative design, the application launch information may be obtained by referring to above-mentioned system information and/or other system information.

Figure 2:
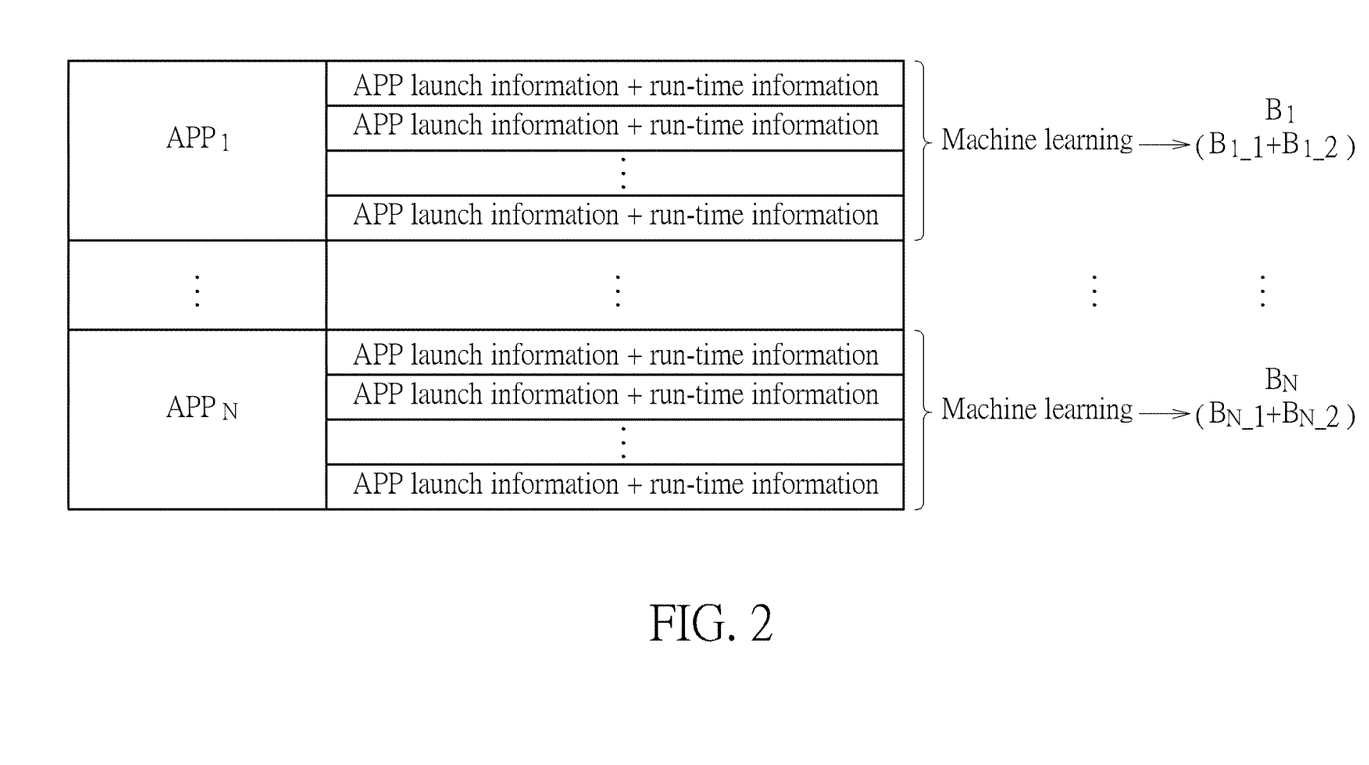
FIG. 2 is a diagram illustration computation of pre-built operating behaviors according to an embodiment of the present invention.

The application run-time information is obtained during an effective running time of the application, and may include die junction temperature, printed circuit board (PCB) temperature, CPU/GPU/memory utilization and/or current consumption. The effective running time starts when an application starts using CPU/GPU resources to make the CPU/GPU utilization exceeds a utilization threshold (e.g., 80%), and ends when the CPU/GPU utilization drops below the utilization threshold and lasts for a predetermined time period. However, the above definition of the effective running time is merely one example. That is, the definition of the effective running time may be adjusted, depending upon actual design consideration. Any application behavior design using the proposed application run-time information would fall within the scope of the present invention.

A machine learning technique is applied to the known application behavior knowledge of the predetermined applications $APP_1$-$APP_N$ that is gathered by the testing process. The machine learning technique generates a trained operating behavior for each predetermined application based on a set of launch information and a set of run-time information. In this way, the application behavior database 112 is created by the pre-built operating behaviors $B_1$-$B_N$, and then written into the on-chip non-volatile memory such as a flash memory. In this embodiment, each of the pre-built operating behaviors $B_1$-$B_N$ includes a pre-built launch behavior (e.g., $B_1\_1$-$B_N\_1$) derived from a machine-learning result of the gathered launch information and a pre-built run-time behavior (e.g., $B_1\_2$-$B_N\_2$) derived from a machine-learning result of the gathered run-time information.

The classification unit 114 is coupled to the processing system 102 and the application behavior database 112, and arranged to detect an operating behavior $B_D$ of the application APP during execution of the application APP, and determine the application identification result $RT_{APP}$ by checking if the detected operating behavior $B_D$ of the application APP is classified as one of the operating behaviors $B_1$-$B_N$ of the specific applications $APP_1$-$APP_N$ (e.g., pre-built operating behaviors of predetermined applications and/or trained operating behaviors of new applications). In this embodiment, the detected operating behavior $B_D$ includes a detected launch behavior $B_D\_1$ and/or at least one detected run-time behavior $B_D\_2$. Please refer to FIG. 3, which is a diagram illustrating the operation of detecting an operating behavior of an application running on an electronic device according to an embodiment of the present invention. When program codes of the application APP are loaded and executed by CPU 106 of the processing system 102, the application APP is launched on the electronic device 100. Hence, the classification unit 114 obtains the detected launch behavior $B_D\_1$ by detecting the application launch information such as loaded shared libraries, process virtual memory map and/or system call history. This is for illustrative purposes only, and is not meant to be a limitation of the present invention. Alternatively, the application launch information may be obtained by referring to above-mentioned system information and/or other system information.

Figure 3:
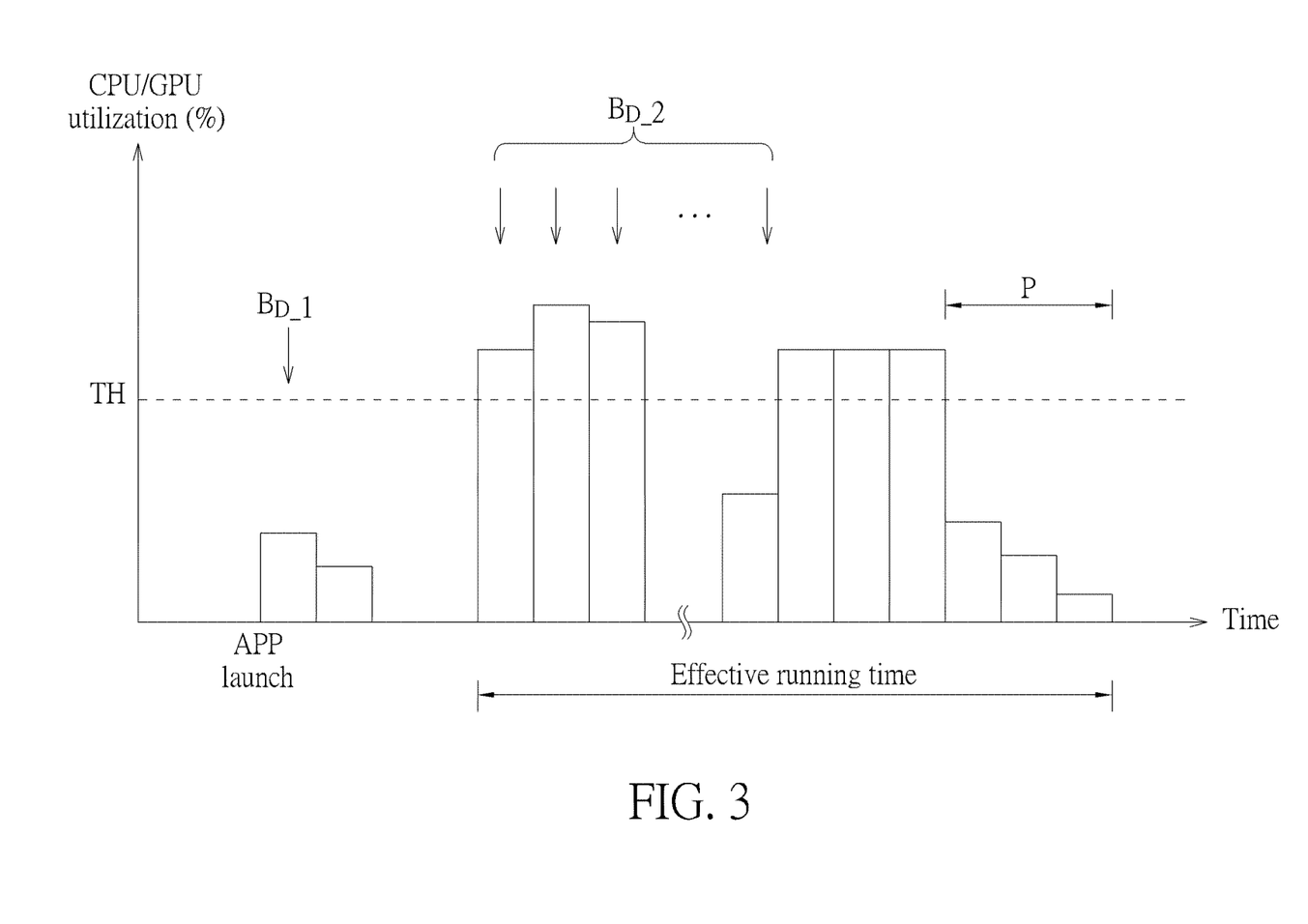
FIG. 3 is a diagram illustrating the operation of detecting an operating behavior of an application running on an electronic device according to an embodiment of the present invention.

For certain application such as the benchmarking application, the application will wait for a user input to start its main function after launched. Hence, the CPU/GPU utilization is low before the user input is entered. In other words, there may be a time offset between the time when the application is launched and the time when the application starts using the CPU/GPU resources heavily. To more accurately detect the run-time behavior of the application, the classification unit 114 is therefore configured to detect the application run-time information during an effective running time of the application. As mentioned above, the effective running time starts when an application starts using CPU/GPU resources to make the CPU/GPU utilization exceeds a utilization threshold TH (e.g., 80%), and ends when the CPU/GPU utilization drops below the utilization threshold TH and lasts for a predetermined time period P. Please note that the definition of the effective running time may be adjusted, depending upon actual design consideration. That is, using a different definition of the effective running time is feasible in another run-time behavior detection design. In this embodiment, the classification unit 114 may be configured to obtain the at least one detected run-time behavior $B_{D\_}2$ by periodically checking the application run-time information such as die junction temperature, PCB temperature, CPU/GPU/memory utilization and/or current consumption.

The application identification result $RT_{APP}$ is set based on whether the detected operating behavior $B_D$ of the application APP can be classified as one of the operating behaviors $B_1$-$B_N$ of the specific applications $APP_1$-$APP_N$. In other words, the classification unit 114 refers to the detected operating behavior $B_D$ to decide if the application APP is one of the specific applications $APP_1$-$APP_N$. Since the detected operating behavior $B_D$ may include a detected launch behavior $B_{D\_}1$ and/or at least one detected run-time behavior $B_{D\_}2$, the application classification operation may include comparing the detected launch behavior $B_{D\_}1$ against all launch behaviors included in the operating behaviors $B_1$-$B_N$ and/or comparing each detected run-time behavior $B_{D\_}2$ against at least a portion (i.e., part or all) of the run-time behaviors included in the operating behaviors $B_1$-$B_N$. Considering a case where the operating behaviors $B_1$-$B_N$ are pre-built operating behaviors as illustrated in FIG. 2, the classification unit 114 may compare the detected launch behavior $B_{D\_}1$ against all pre-built launch behaviors $B_{1\_}1$-$B_{N\_}1$ and/or comparing each detected run-time behavior $B_{D\_}2$ against at least a portion (i.e., part or all) of the pre-built run-time behaviors $B_{1\_}2$-$B_{N\_}2$.

In a preferred embodiment, since the detected operating behavior $B_D$ may include one detected launch behavior $B_{D\_}1$ and/or at least one detected run-time behavior $B_{D\_}2$, the classification unit 114 may refer to at least the detected launch behavior $B_{D\_}1$ to determine the application identification result $RT_{APP}$. When obtaining the detected launch behavior $B_{D\_}1$, the classification unit 114 compares the detected launch behavior $B_{D\_}1$ against launch behaviors (e.g., $B_{1\_}1$-$B_{N\_}1$) included in operating behaviors $B_1$-$B_N$ of the specific applications $APP_1$-$APP_N$. If the similarity between the detected launch behavior $B_{D\_}1$ and each of the launch behaviors (e.g., $B_{1\_}1$-$B_{N\_}1$) does not exceed a first predetermined similarity threshold, the classification unit 114 directly sets the application identification result $RT_{APP}$ to indicate that the application APP is a new application (i.e., the application APP cannot be classified as one of the specific applications $APP_1$-$APP_N$), and does not need to detect the application run-time information to obtain the at least one detected run-time behavior $B_{D\_}2$.

If the similarity between the detected launch behavior $B_{D\_}1$ and at least one of the launch behaviors (e.g., $B_{1\_}1$-$B_{N\_}1$) exceeds the first predetermined similarity threshold, the classification unit 114 selects at least one specific application from the specific applications $APP_1$-$APP_N$, where each selected specific application has a launch behavior that is similar/identical to the detected launch behavior $B_{D\_}1$ due to the similarity between the detected launch behavior $B_{D\_}1$ and the launch behavior exceeding the first predetermined similarity threshold. In addition, the classification unit 114 further detects the application run-time information to obtain the at least one detected run-time behavior $B_{D\_}2$, and compares each detected run-time behavior against run-time behavior(s) of the at least one specific application selected from the specific applications $APP_1$-$APP_N$ based on the result of comparing the detected launch behavior $B_{D\_}1$ against the launch behaviors (e.g., $B_{1\_}1$-$B_{N\_}1$).

Concerning each detected run-time behavior $B_{D\_}2$, the classification unit 114 checks if the similarity between the detected run-time behavior $B_{D\_}2$ and one of the run-time behaviors of selected specific applications exceeds a second predetermined similarity threshold, where the second predetermined similarity threshold used for examining the detected run-time behavior $B_{D\_}2$ may be identical to or different from the first predetermined similarity threshold used for examining the detected launch behavior $B_{D\_}1$. For example, when the number of detected run-time behaviors, each found similar/identical to the same specific run-time behavior due to the similarity between the detected run-time behavior and the specific run-time behavior exceeding the second predetermined similarity threshold, is larger than a specified threshold value, the classification unit 114 would set the application identification result $RT_{APP}$ to indicate that that the application APP currently running on the electronic device 100 is classified as one specific application (which is one of the at least one application selected from the specific applications $APP_1$-$APP_N$ based on the result of comparing the detected launch behavior $B_{D\_}1$ against the launch behaviors (e.g., $B_{1\_}1$-$B_{N\_}1$) of the operating behaviors $B_1$-$B_N$, and further has the specific run-time behavior that is most similar to the at least one detected run-time behavior $B_{D\_}2$).

However, if the number of detected run-time behaviors, each found similar/identical to the same specific run-time behavior due to the similarity between the detected run-time behavior and the specific run-time behavior exceeding the second predetermined similarity threshold, is not larger than the specified threshold value, the classification unit 114 would set the application identification result $RT_{APP}$ to indicate that the application APP is a new application (i.e., the application APP cannot be classified as one of the specific applications $APP_1$-$APP_N$).

When the application identification result $RT_{APP}$ indicates that the application APP is a new application, the machine-learning unit 118 is operative to update the application behavior database 112, such that the updated application behavior database 112 would record the application APP as a new specific application and further record a trained operating behavior as an operating behavior of the newly-added specific application. Like the pre-built operating behavior, the trained operating behavior may include application launch information and run-time information.

Figure 4:
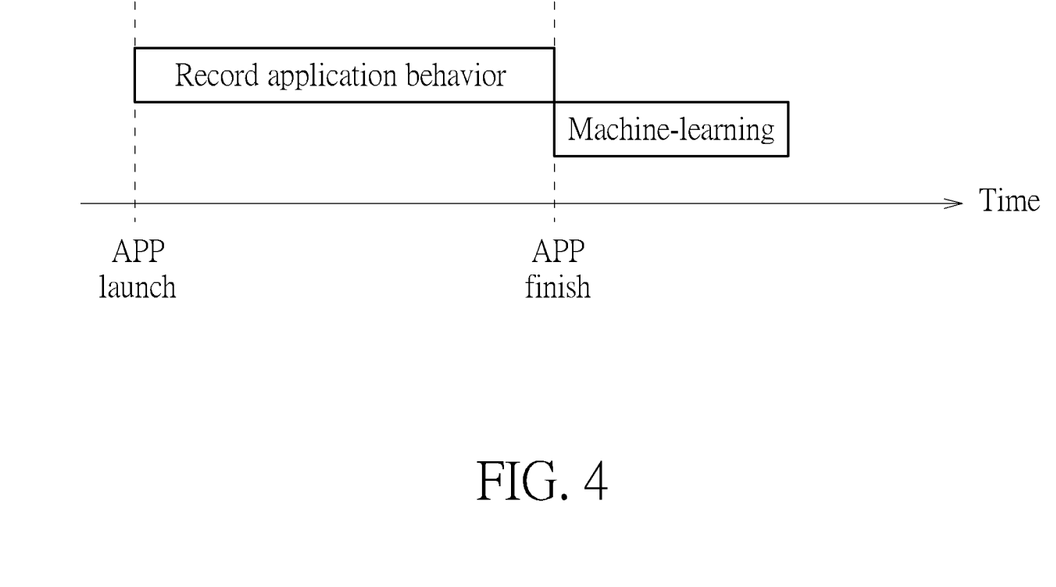
FIG. 4 is a diagram illustrating the operation of updating an application behavior database according to an embodiment of the present invention.

Please refer to FIG. 4, which is a diagram illustrating the operation of updating the application behavior database 112 according to an embodiment of the present invention. When the application APP is launched, the operating behavior $B_E$ of the application APP during execution of the application APP, including the launch behavior $B_D\_1$ and at least one run-time behavior $B_D\_2$, is recorded by the machine-learning unit 118 by default. When the application identification result $RT_{APP}$ indicates that the application APP is not classified as one of the specific applications $APP_1$-$APP_N$, the machine-learning unit 118 is further arranged to obtain a trained operating behavior $B_{NEW}$ of the application APP based on the recorded operating behavior of the application APP, and add the trained operating behavior $B_{NEW}$ of the application APP to the application behavior database 112 after completion of the application APP. In this way, besides original entries indexed by the specific applications $APP_1$-$APP_N$, the updated application behavior database 112 will have a new entry indexed by the application APP and having the trained operating behavior $B_{NEW}$ stored therein.

In conclusion, if the application behavior database 112 has pre-built operating behaviors initially stored therein when the electronic device 100 is powered on for the first time, the application behavior database 112 may be updated to include a trained operating behavior of a new application each time an application currently running on the electronic device 100 is classified as a new application. Hence, the specific applications $APP_1$-$APP_N$ mentioned above may include predetermined applications only if no real-time database update for a new application is performed; and may include a combination of at least one predetermined application and at least one new application if real-time database update for a new application has been performed. However, if the electronic device 100 has an empty application behavior database when the electronic device 100 is powered on for the first time, the application behavior database 112 may be created and updated to include machine-learned operating behaviors after the electronic device 100 starts running. Hence, the specific applications $APP_1$-$APP_N$ mentioned above may only include new applications (which are not predetermined applications known at the time the electronic device 100 is manufactured).

The control unit 116 is arranged to configure an application-dependent task according to at least the application identification result $RT_{APP}$. In this embodiment, when the application identification result $RT_{APP}$ indicates that the application APP is not classified as one of the specific applications $APP_1$-$APP_N$, the control unit 116 configures the application-dependent task by a default task setting $SET_{default}$. For example, in a case where the application-dependent task is a DTM task, the default task setting $SET_{default}$ is a default thermal strategy.

The control unit 116 may be configured to have knowledge of application behavior information of the specific applications $APP_1$-$APP_N$. For example, the application behavior information of each specific application may record the expected running time/execution time of the specific application (i.e., how long the specific application will use CPU/GPU). Hence, when the application identification result $RT_{APP}$ indicates that the application APP is classified as one of the specific applications $APP_1$-$APP_N$, the control unit 116 determines a task setting $SET_{best}$ at least based on application behavior information of the application APP (e.g., how long the application APP will use CPU 106/GPU 108, as indicated by known application behavior information of a matching specific application), and configures the application-dependent task by the task setting task setting $SET_{best}$. For example, the task setting $SET_{best}$ may be determined by computation or table lookup, depending upon actual design consideration.

Preferably, the control unit 116 determines the task setting $SET_{best}$ based on the application behavior information of the application APP and additional reference information such as the environmental information. In a case where the application-dependent task is a DTM task, the task setting is a calculated thermal strategy for the application APP. The environmental information may include chip corner/leakage, ambient temperature, etc. In one exemplary design of the present invention, the task setting $SET_{best}$ may be a thermal strategy including a CPU/GPU power budget constraint and/or a die junction temperature rising slope constraint. For example, the power budget constraint for CPU/GPU may include a frequency setting and a hot-plug setting, where the frequency setting specifies the operating clock speed of CPU 106 and the operating clock speed of GPU 108, and the hot-plug setting specifies the number of powered-on CPU cores and the number of powered-on GPU cores. The die junction temperature rising slope constraint may include a frequency of switching the CPU 106 between different operating clock speeds and a frequency of switching the GPU 108 between different operating clock speeds.

Figure 5:
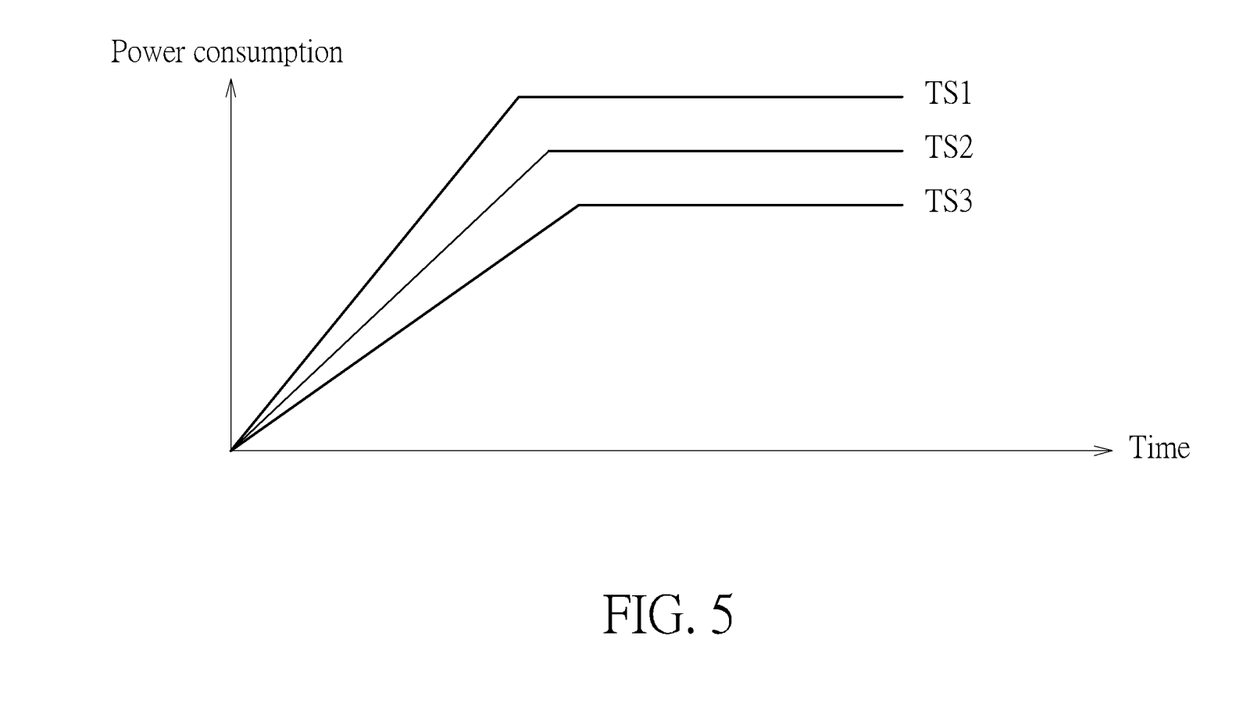
FIG. 5 is a diagram illustrating different thermal strategies according to an embodiment of the present invention.

Please refer to FIG. 5, which is a diagram illustrating different thermal strategies according to an embodiment of the present invention. A thermal strategy should be properly designed to achieve a desired power budget control for an application. Therefore, different thermal strategies may be used to meet different power budget control requirements, respectively. For example, based on the application behavior information of a first application (e.g., an application with a running time/execution time of 5 minutes), the control unit 116 may select the first thermal strategy TS1 for better thermal throttling control; based on the application behavior information of a second application (e.g., an application with a running time/execution time of 3 minutes), the control unit 116 may select the second thermal strategy TS2 for better thermal throttling control; and based on the application behavior information of a third application (e.g., an application with a running time/execution time of 0.5 minutes), the control unit 116 may select the third thermal strategy TS3 for better thermal throttling control.

In conclusion, the application performance can be optimized by using machine learning technology for identifying an application, knowing the future behavior of the identified application, and deciding a best thermal strategy at least based on the known application behavior. It should be noted that the TDM task is merely one example of the application-dependent task. The proposed application identification technique may be involved in configuring an application-dependent task other than the TDM task. This also falls within the scope of the present invention.

Figure 6:
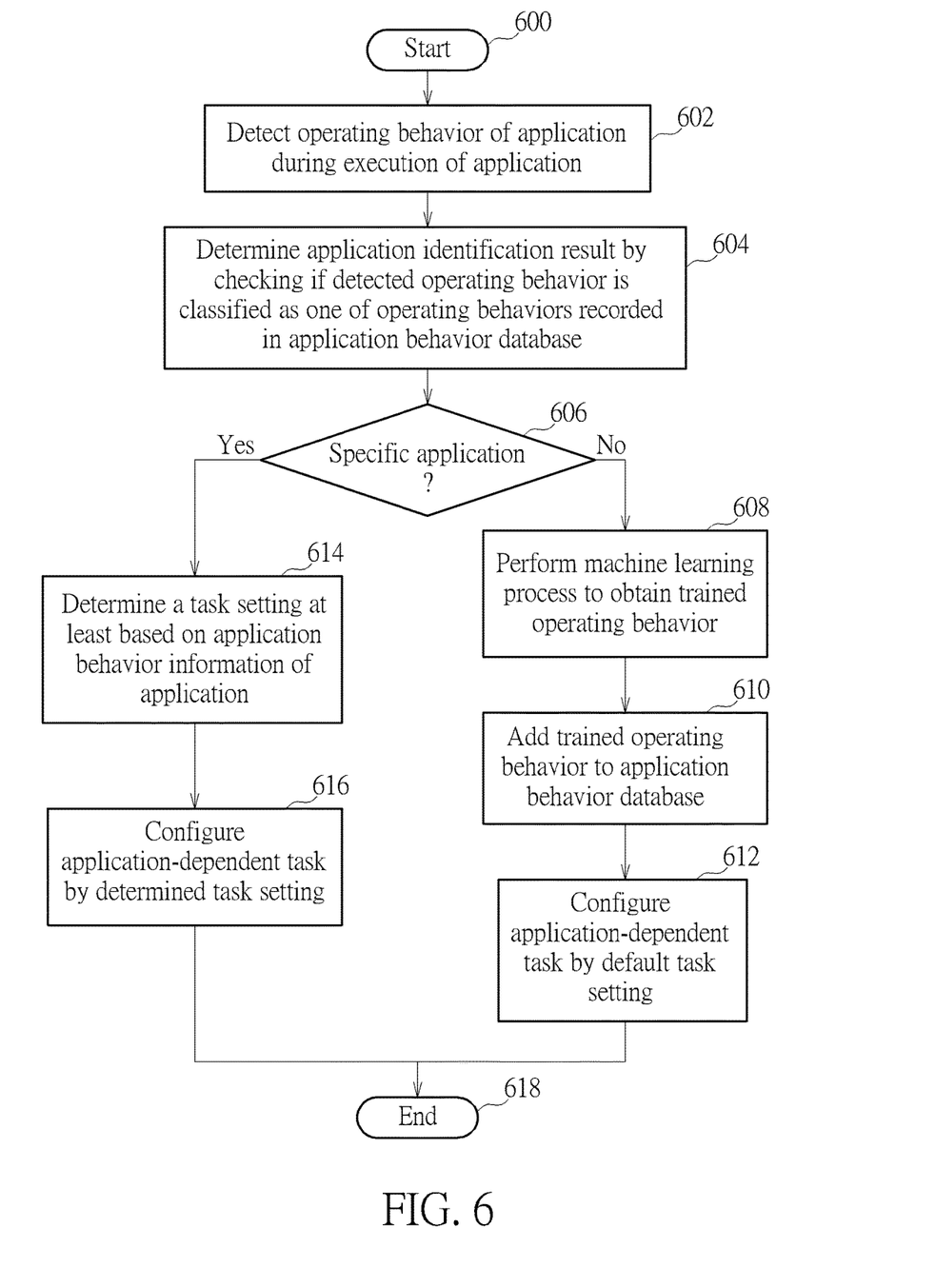
FIG. 6 is a flowchart illustrating a method for configuring an application-dependent task according to an embodiment of the present invention.

FIG. 6 is a flowchart illustrating a method for configuring an application-dependent task according to an embodiment of the present invention. Provided that the result is substantially the same, the steps are not required to be executed in the exact order shown in FIG. 6. The exemplary method may be employed by the electronic device 100, and may be briefly summarized as below.

Step 600: Start.

Step 602: Detect an operating behavior of an application during execution of the application.

Step 604: Determine an application identification result by checking if the detected operating behavior of the application is classified as one of operating behaviors of specific applications in an application behavior database.

Step 606: Check if the application identification result indicates that the application is classified as one of the specific applications. If yes, go to step 614; otherwise, go to step 608.

Step 608: Perform a machine learning process to obtain a trained operating behavior based on recorded operating behavior of the application obtained during execution of the application.

Step 610: Add the trained operating behavior of the application to the application behavior database.

Step 612: Configure an application-dependent task (e.g., a dynamic thermal management task) by a default task setting (e.g., a default thermal strategy). Go to step 618.

Step 614: Determine a task setting at least based on application behavior information of the identified application.

Step 616: Configure the application-dependent task by the determined task setting.

Step 618: End.

As a person skilled in the art can readily understand details of each step shown in FIG. 6 after reading above paragraphs, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device, comprising:
    a processing system, arranged to execute an application; and
    a management circuit, arranged to detect an operating behavior of the application during execution of the application, analyze the detected operating behavior of the application to generate an application identification result which indicates if the application is a specific application, and configure an application-dependent task according to at least the application identification result, wherein the application-dependent task comprises adjusting operating frequency and operating voltage of a processor of the processing system, and the application-dependent task is a dynamic thermal management (DTM) task;
    wherein the management circuit comprises:
    an application behavior database, arranged to store operating behaviors of a plurality of specific applications;
    a classification unit, arranged to detect the operating behavior of the application, and determine the application identification result by checking if the detected operating behavior of the application is classified as one of the operating behaviors of the specific applications;
    a control unit, arranged to determine a task setting at least based on application behavior information of the application and configure the application-dependent task by the task setting when the application identification result indicates that the application is classified as one of the specific application, wherein the task setting is a thermal strategy for the application.

2. The electronic device of claim 1, wherein each of the operating behaviors comprises a launch behavior; the detected operating behavior of the application comprises a detected launch behavior; and the classification unit compares the detected launch behavior against launch behaviors of the specific applications.

3. The electronic device of claim 2, wherein each of the operating behaviors further comprises a run-time behavior; the detected operating behavior of the application further comprises at least one detected run-time behavior; and the classification unit further compares each detected run-time behavior against at least a portion of the run-time behaviors of the specific applications.

4. The electronic device of claim 3, wherein the classification unit selects at least one specific application from the specific applications by comparing the detected launch behavior against the launch behaviors of the specific applications, and compares each detected run-time behavior against run-time behavior(s) of the at least one specific application only.

5. The electronic device of claim 3, wherein the classification unit compares the detected launch behavior against the launch behaviors of the specific applications according to a first predetermined similarity threshold, and compares each detected run-time behavior against one or more run-time behaviors of the at least one specific application according to a second predetermined similarity threshold different from the first predetermined similarity threshold.

6. The electronic device of claim 3, wherein when a similarity between the detected launch behavior and the launch behavior of each specific application is not greater than a predetermined similarity threshold, the classification unit sets the application as a new application without comparing each detected run-time behavior against one or more run-time behaviors of the at least one specific application.

7. The electronic device of claim 1, wherein the management circuit further comprises:
    a machine-learning unit, arranged to record the operating behavior of the application during execution of the application, and when the application identification result indicates that the application is not classified as one of the specific applications, obtain a trained operating behavior of the application based on the recorded operating behavior of the application and add the trained operating behavior of the application to the application behavior database after completion of the application.

8. The electronic device of claim 1, wherein at least one of the specific applications is a predetermined application, and the operating behaviors of the specific applications include a pre-built operating behavior of the predetermined application.

9. The electronic device of claim 1, wherein the management circuit further comprises:
    a machine-learning unit, arranged to generate an operating behavior of at least one of the specific applications.

10. The electronic device of claim 1, wherein the control unit determines the task setting based on the application behavior information and environmental information.

11. The electronic device of claim 1, wherein the control unit is further arranged to configure the application-dependent task by a default task setting when the application identification result indicates that the application is not classified as one of the specific applications.

12. A method for configuring an application-dependent task, comprising:
    executing an application;
    detecting an operating behavior of the application during execution of the application;
    analyzing the detected operating behavior of the application to generate an application identification result which indicates if the application is a specific application; and configuring the application-dependent task according to at least the application identification result;
wherein the application-dependent task comprises adjusting operating frequency and operating voltage of a processor of the processing system, and the application-dependent task is a dynamic thermal management (DTM) task;
wherein the step of analyzing the detected operating behavior of the application comprises:
determining the application identification result by checking if the detected operating behavior of the application is classified as one of operating behaviors of a plurality of specific applications in an application behavior database;
wherein the step of configuring the application-dependent task comprises:
when the application identification result indicates that the application is classified as one of the specific application, determining a task setting at least based on application behavior information of the application, and configuring the application-dependent task by the task setting, wherein the task setting is a thermal strategy for the application.

13. The method of claim 12, wherein each of the operating behaviors comprises a launch behavior; the detected operating behavior of the application comprises a detected launch behavior; and the checking step comprises:
comparing the detected launch behavior against launch behaviors of the specific applications.

14. The method of claim 13, wherein each of the operating behaviors further comprises a run-time behavior; the detected operating behavior of the application further comprises at least one detected run-time behavior; and the checking step further comprises:
comparing each detected run-time behavior against at least a portion of the run-time behaviors of the specific applications.

15. The method of claim 14, wherein at least one specific application is selected from the specific applications by comparing the detected launch behavior against the launch behaviors of the specific applications, and each detected run-time behavior is compared against run-time behavior(s) of the at least one specific application only.

16. The method of claim 12, further comprising:
recording the operating behavior of the application during execution of the application; and
when the application identification result indicates that the application is not classified as one of the specific applications, performing a machine-learning operation to obtain a trained operating behavior of the application based on the recorded operating behavior of the application and adding the trained operating behavior of the application to the application behavior database after completion of the application.

17. The method of claim 12, wherein at least one of the specific applications is a predetermined application, and the operating behaviors of the specific applications include a pre-built operating behavior of the predetermined application.

18. The method of claim 12, further comprising:
performing a machine-learning operation to generate an operating behavior of at least one of the specific applications.

19. The method of claim 12, wherein the task setting is determined based on the application behavior information and environmental information.

20. The method of claim 12, wherein the step of configuring the application-dependent task further comprises:
when the application identification result indicates that the application is not classified as one of the specific applications, configuring the application-dependent task by a default task setting.

* * * * *